United States Patent
Christen et al.

(10) Patent No.: US 8,095,291 B2
(45) Date of Patent: Jan. 10, 2012

(54) VOICE CONTROL SYSTEM AND METHOD FOR A MOTOR VEHICLE WITH A STOP/START DEVICE

(75) Inventors: Urs Christen, Aachen (DE); Rainer Busch, Aachen (DE); Uwe Gussen, Huertgenwald (DE); Thomas Rambow, Aachen (DE); Markus Kees, Grevenbroich (DE); Armin Mueller-Lerwe, Kerpen-Bergerhausen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 12/492,262

(22) Filed: Jun. 26, 2009

(65) Prior Publication Data

US 2009/0326790 A1 Dec. 31, 2009

(30) Foreign Application Priority Data

Jun. 30, 2008 (DE) .......................... 10 2008 030 898

(51) Int. Cl.
*G06F 19/00* (2011.01)
(52) U.S. Cl. ...... 701/102; 701/107; 701/112; 123/179.1
(58) Field of Classification Search .................. 701/102, 701/107, 112, 114, 115; 123/179.1, 179.4
See application file for complete search history.

(56) References Cited

U.S. PATENT DOCUMENTS

| | | | |
|---|---|---|---|
| 6,647,328 B2 * | 11/2003 | Walker | 701/36 |
| 6,941,218 B2 | 9/2005 | Wolf et al. | |
| 7,259,357 B2 * | 8/2007 | Walker | 219/243 |
| 2004/0263099 A1 * | 12/2004 | Maslov et al. | 318/254 |
| 2008/0091309 A1 * | 4/2008 | Walker | 701/1 |

FOREIGN PATENT DOCUMENTS

| | | |
|---|---|---|
| EP | 1469195 | 9/2006 |
| EP | 1534554 | 7/2007 |

* cited by examiner

*Primary Examiner* — John Kwon
(74) *Attorney, Agent, or Firm* — David B. Kelley

(57) ABSTRACT

The invention relates to a control device for a motor vehicle having an internal combustion engine and a stop/start device, and to a method for controlling the operation of an internal combustion engine in such a motor vehicle, wherein the stop/start device is designed to switch off the internal combustion automatically when at least one stop condition is met, wherein the switching off of the internal combustion engine when the stop condition is present does not take place until after a switch off delay time has passed. The control device is designed to prevent, in reaction to a first voice command, the automatic switching off of the internal combustion engine for a predefined time period and/or until a predefined vehicle operating state criterion has been fulfilled irrespective of whether or not the stop condition was already met at the time when the voice command was issued.

9 Claims, 6 Drawing Sheets

VOICE CONTROL SYSTEM AND METHOD FOR A MOTOR VEHICLE WITH A STOP/START DEVICE

FIELD OF THE INVENTION

Figure 1:
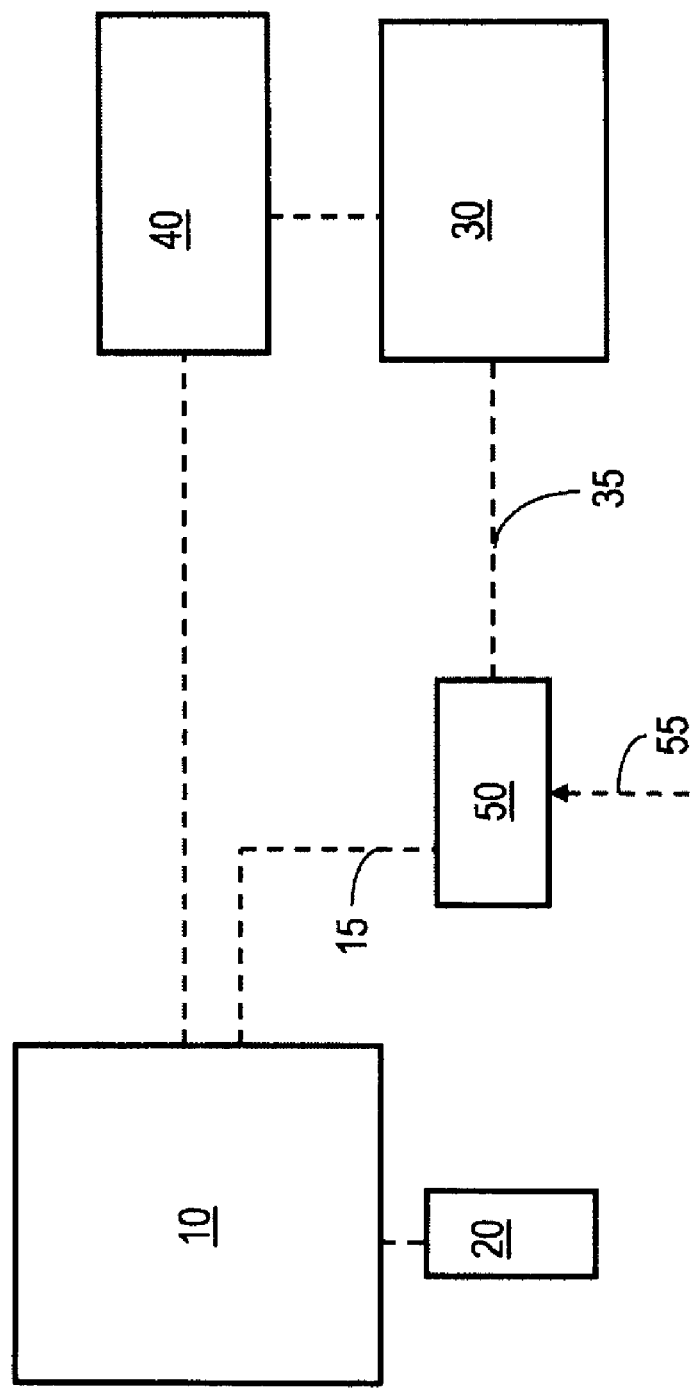

The invention relates to a control device for a motor vehicle having an internal combustion engine and a stop/start device, and to a method for controlling the operation of an internal combustion engine in such a motor vehicle.

BACKGROUND OF THE INVENTION

In hybrid vehicles with a stop/start device, the internal combustion engine is switched off automatically if no driving force is required, for example when the vehicle is stopped at a traffic light. As soon as driving force is required again, that is to say for example when the traffic light switches to "green" and the driver activates the accelerator pedal, the vehicle is restarted by means of the electric motor. Various strategies have been developed for controlling the automatic switching off of the internal combustion engine in hybrid vehicles with a stop/start device.

EP 1 469 195 A1 discloses a method in which the internal combustion engine shuts down automatically as soon as the operating conditions which are provided for this are met for a predefined time. In this method, in a situation in which all the conditions for the switching off are met, the driver can prevent the automatic switching off of the internal combustion engine within the predefined time by, for example, activating within this time a button, depressing the brake pedal to a greater degree or issuing a voice command.

EP 1 534 554 B1 discloses a method for controlling a drive train which permits individual adaptation of the drive train management system by the driver and to the driver, for which purpose the drive train management system carries out a learning function in which it changes associated parameters or state data of the drive train to adapt them to the driving behavior.

U.S. Pat. No. 6,941,218 B2 discloses a stop/start device for a locomotive and a method for controlling this device, wherein there is provision for the stop/start device to be deactivated in reaction to a deactivation command.

While hybrid vehicles with a stop/start device are operating, there may be the problem that switching off of the internal combustion engine or restarting it in the respective current situation does not correspond to the driver's wishes. For example, the situation may occur in which the driver stops temporarily at an intersection due to the traffic and the stop/start device switches off the internal combustion engine at just that time at which the driver would like to drive off again owing to the changed traffic conditions. Furthermore, in some cases the driver carries out parking maneuvers during which it is undesirable for the internal combustion engine to be switched off and restarted. whenever the brake pedal or accelerator pedal is activated.

SUMMARY OF THE INVENTION

Against the above background, an object of the present invention is to make available a control device for a motor vehicle having an internal combustion engine and a stop/start device and a method for controlling the operation of an internal combustion engine in such a motor vehicle, which control device and method permit improved adaptation of the stop/start functionality to the respective current conditions.

A control device for a motor vehicle having an internal combustion engine and a stop/start device, wherein the stop/start device is designed to switch off the internal combustion engine automatically when at least one stop condition is met, and wherein the switching off of the internal combustion engine when the stop condition is present does not take place until after a switch off delay time has passed, is designed to the effect that, in reaction to a first voice command, the automatic switching off of the internal combustion engine is prevented for a predefined time period and/or until a predefined vehicle operating state criterion is fulfilled, irrespective of whether or not the stop condition was already met at the time when the voice command was issued.

The predefined time period for which automatic shutting down is to be suppressed is typically selected to be significantly longer than the switch off delay time. The switch off delay time is typically of the order of magnitude of several seconds, while the predefined time period for the suppression of switching off is typically of the order of magnitude of one or more minutes.

The control device according to the invention enables the driver to prevent automatic stopping temporarily and in advance in any desired situation, that is to say for example even when approaching an intersection or when aiming for a parking space. In this context, for example in the case of aiming for a parking space, it is possible for this blocking function to remain effective in particular also for a plurality of maneuvers and therefore it does not have to be re-implemented in this case before each imminent switching off process. As a result of the fact that the prevention of the automatic switching off of the internal combustion engine is possible irrespective of whether or not the stop condition was already met at the time when the voice command was issued, the driver can decide, at any time and in a flexible way, about behavior which deviates from the standard behavior, and can change this behavior selectively by means of a simple voice command, as a result of which improved and more flexible adaptation of the functionality of the automatic switching off of the internal combustion engine to the respectively present conditions is made possible.

By virtue of the fact that the prevention of the automatic switching off of the internal combustion engine in reaction to the first voice command takes place for a predefined time period and/or until a predefined vehicle operating state criterion is fulfilled, this blocking under the driver's influence is, as it were, only temporary—in contrast to, for example, calibration of the stop/start device, with the result that in a (possibly otherwise identical) later driving situation or traffic situation the stop/start device can exhibit the standard behavior again.

The control by means of a voice command results in the fact that, in particular with vehicles with a dashboard which is overloaded with numerous control keys, the risk of incorrect operation by the driver is reduced since the adding of further control keys and the associated increasing of the risk of the driver confusing control keys for one another in any decisive driving situation is avoided. Furthermore, the driver does not need to take a hand off the steering wheel or avert his gaze from the roadway (for example in order to locate the suitable control key), which further increases road safety.

According to one preferred embodiment, the predefined vehicle operating state criterion comprises a velocity threshold value of the motor vehicle being exceeded or a rotational speed threshold value of the internal combustion engine being exceeded.

According to one preferred embodiment, the control device is designed to trigger directly automatic switching off of the internal combustion engine in reaction to a second voice command when the stop condition is present, without waiting for the switch off delay to pass.

According to one preferred embodiment the stop/start device is also designed for automatic starting of the internal combustion engine when at least one start condition is met, and the control device is also designed to trigger direct automatic starting of the internal combustion engine in reaction to a third voice command when the engine is switched off if a transmission which is assigned to the internal combustion engine is in the idling mode and/or the clutch of the internal combustion engine is disengaged.

According to one preferred embodiment, the control device is designed to start the internal combustion engine automatically when at least one start condition is met, and the control device is also designed not to carry out automatic starting of the internal combustion engine which is indicated to the driver visually and/or by means of a voice output and is implemented with a predefined delay in reaction to a fourth voice command.

According to one preferred embodiment, the control device is also designed to continuously block the automatic switching off of the internal combustion engine in reaction to a fifth voice command issued at any desired time while the vehicle is operating, wherein the blocking can be canceled again in reaction to a sixth voice command.

According to one preferred embodiment, the control device is designed to locate the starting location of the voice commands and in doing so to take into account only the voice commands which are issued from the position of the driver of the motor vehicle. For this purpose, for example at least two microphones (for example a microphone in the dashboard and a further microphone in the region of the A pillar or B pillar) can be provided. Such a configuration has the advantage that it is possible to ensure that it is actually the driver (and not some other vehicle occupant, for example) who is communicating with the system.

According to one preferred embodiment, the motor vehicle is embodied as a hybrid vehicle, and the control device is designed to bring about switching over to exclusively electric driving in reaction to a seventh voice command.

The invention also relates to a method for controlling the operation of an internal combustion engine in a motor vehicle having an internal combustion engine and a stop/start device. For preferred refinements of the method, reference is made to the above statements relating to the control device.

The invention also relates to a motor vehicle having an internal combustion engine and a stop/start device, which vehicle has a control device having the features described above.

Further refinements of the invention can be found in the description and in the dependent claims.

The invention will be explained below on the basis of preferred embodiments and with reference to the appended figures.

DRAWINGS

FIG. 1 shows an arrangement with a belt-operated starter generator ("B-ISG") explaining an exemplary application of the invention; and FIGS. 2-6 show flowcharts explaining different use scenarios of the present invention.

DETAILED DESCRIPTION OF AN EMBODIMENT OF THE INVENTION

FIG. 1 is a schematic illustration of an arrangement having a belt-operated starter generator ("B-ISG") explaining an exemplary application of the invention.

An integrated starter generator (abbreviated as ISG) 10 combines the functionality of the starting of the internal combustion engine on the one hand with the generation of electrical energy on the other and is coupled, according to FIG. 1, to the crankshaft via a drive belt 20. The integrated starter generator 10 is also connected to a battery 40 which has a battery monitoring device 30. The integrated starter generator 10 and battery monitoring device 30 are connected to a stop/start device 50 via a CAN bus 15 or 35. The stop/start device 50 is also supplied with vehicle-related input data 55.

The invention is, of course, not restricted to use in conjunction with an integrated starter generator but can also be implemented in an arrangement in which a conventional generator for generating electrical energy is combined with a conventional starter motor.

The arrangement according to FIG. 1, which is known per se, has the advantage that the internal combustion engine can be switched off and started again automatically under certain conditions, as a result of which fuel efficiency and driving comfort are improved. In particular, whenever the vehicle is stationary, switching off the internal combustion engine results in a savings in fuel and a reduction in engine noise.

The stop/start device 50 is controlled by a monitoring controller as a function of system state parameters and driver inputs and it outputs commands for the switching off of the internal combustion engine. The internal combustion engine is restarted on the basis of other driver inputs or other system states. This respectively takes place automatically in reaction to the monitoring controller and to the activation of the pedals by the driver, without renewed manual starting of the internal combustion engine being necessary for this purpose.

Furthermore, various strategies for controlling the stop/start functionality when the vehicle is stationary are known, and this can take place either in the idling mode or when the gear speed is engaged. In vehicles with a manual transmission, the idling position can either be fixed by means of sensors or else it can be derived therefrom that the drive shaft and the output shaft of the transmission have rotational speeds which cannot be combined with one another. However, in the latter case, the idling position cannot be determined when the vehicle and internal combustion engine are stationary.

There may be different triggering events for automatic restarting of the internal combustion engine.

Triggering events which are triggered by the driver and which trigger restarting are, for example, the activation of the accelerator pedal or of the clutch pedal, release of the brake pedal or engagement of a gear speed. System-induced triggering events for triggering restarting of the internal combustion engine are, for example, the reaching of a state with a low battery charge, the starting up of the air-conditioning system or lowering of the brake vacuum. When one of these triggering events occurs, the ISG starts with the revving up of the internal combustion engine insofar as this is permissible in terms of safety considerations, i.e. the drive train is opened and a driver is present in the vehicle (the latter can be checked, for example, by reference to the state of the seatbelt).

The method of functioning of the stop/start device according to the invention will be explained below on the basis of different use scenarios with reference to the flowcharts illustrated in FIGS. 2 to 6. An overview of the different commands used in these use scenarios is given in the following table 1:

TABLE 1

| Command | Effect | Figure |
| --- | --- | --- |
| Deactivate stop | Deactivate entire strategy | FIG. 2 |
| Activate stop | Reactivate entire strategy | FIG. 2 |
| Do not stop | Suppress shutting down of engine for a brief time period (for example by reactivating when velocity of the vehicle exceeds a limiting value) | FIG. 3 |
| Do not start | Suppression of system-induced start | FIG. 4 |
| Stop now | If velocity of the vehicle is below a threshold value, the internal combustion engine is switched off immediately (without the usual delay in stopping) | FIG. 5 |
| Start | If drive train is open (i.e. if transmission is in idling position or clutch is disengaged) internal combustion engine is started. This can be carried out in reaction to a system-induced starting request or without such a starting request. | FIG. 6 |

FIG. 2 shows flowcharts illustrating the effect of the commands "deactivate stop" and "activate stop" in table 1. These commands permit the driver in principle to switch the stop functionality off and on again, with the result that switching off the internal combustion engine depends not only on the velocity of the vehicle but also on the current value of a logic parameter which indicates whether the stop functionality is currently permitted by the driver, and which is denoted below as "stop_suppression".

Figure 2B:
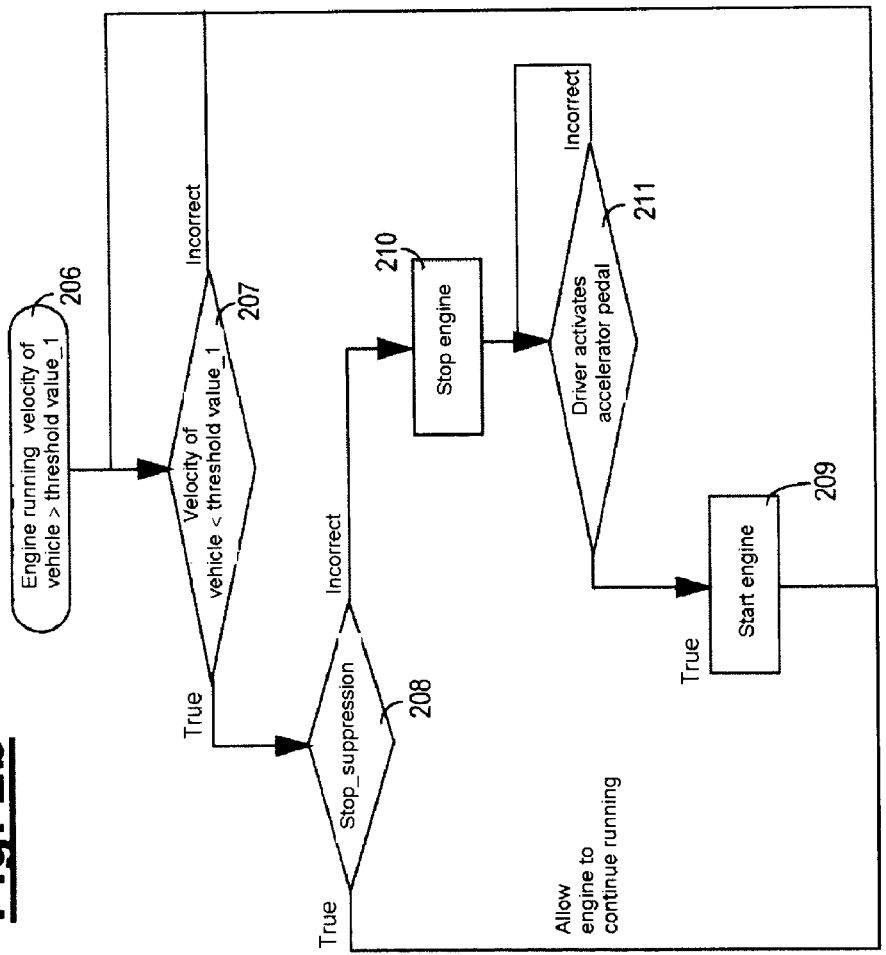
Figure 2A:
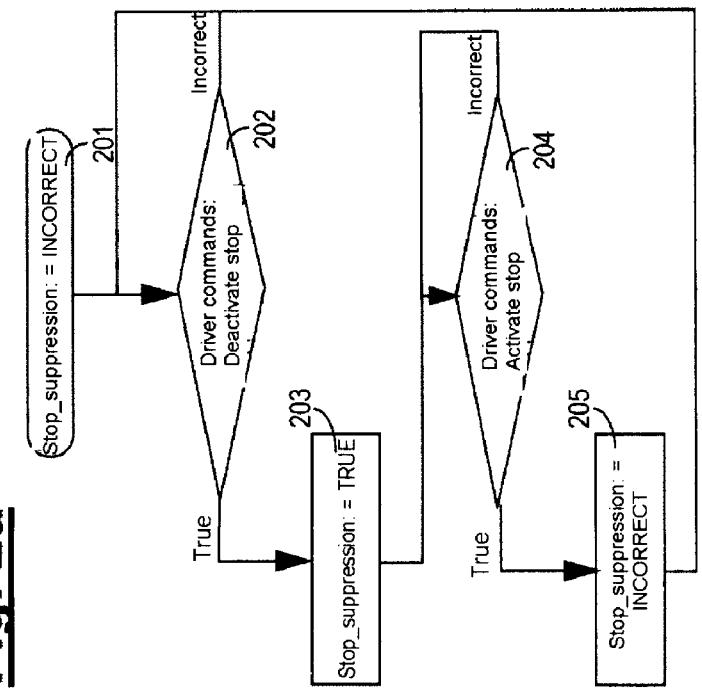

FIGS. 2a-b show two flowcharts, the diagram in FIG. 2a showing the influence or setting of the stop suppression by the driver and FIG. 2b showing the evaluation of the setting of the stop suppression as a function of the state of the vehicle.

According to FIG. 2a, the parameter stop_suppression has the value INCORRECT in the initial state 201. If the driver issues the command "deactivate stop" in step 202, the parameter stop_suppression is set to TRUE in step 203. In this case, the parameter stop_suppression is not set again to INCORRECT in step 205 until the driver issues the command "activate stop" in step 204.

According to FIG. 2b, in the initial state 206, the velocity of the vehicle when the internal combustion engine is running is above a first threshold value. In step 207 it is interrogated whether the velocity of the vehicle drops below the first threshold value. If this is the case, in step 208 the value of the parameter stop_suppression is interrogated. If said parameter has the value TRUE, the engine is kept operating, that is to say continues to run. If, on the other hand, the parameter stop_suppression has the value INCORRECT in step 208, the internal combustion engine is stopped in step 210. In this case, it is interrogated in step 211 whether the driver activates the accelerator pedal. Only if this is the case is the internal combustion engine started in step 209.

Figure 3:
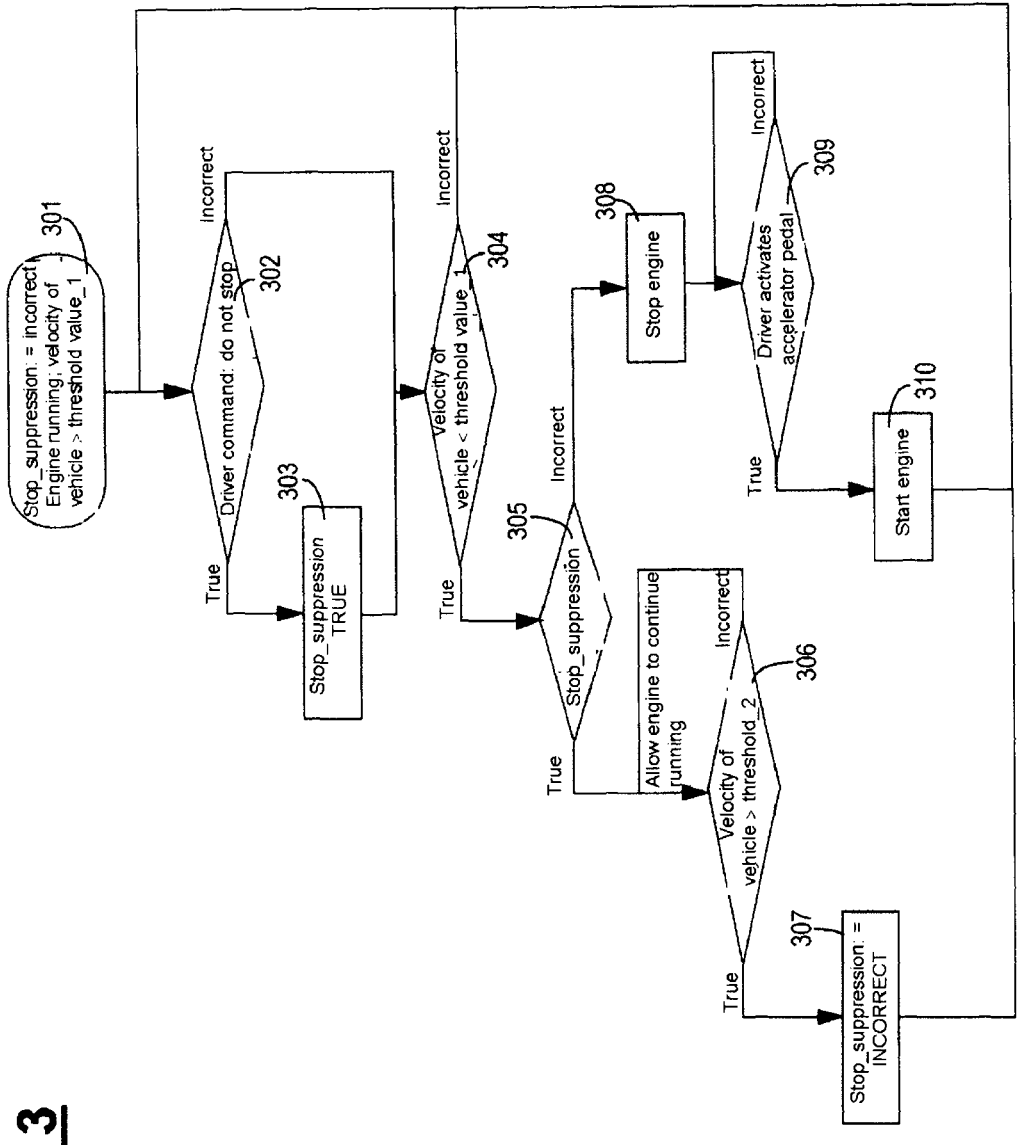

FIG. 3 shows a further flowchart illustrating the effect of the command "do not stop" in table 1. This command permits the driver to prevent switching off of the internal combustion engine in a specific situation (for example when approaching an intersection or when stopping at an intersection), but in such a case switching off in this way can take place again in later situations (for example after a certain velocity of the vehicle has been exceeded again in the meantime).

In the initial state 301 the parameter stop_suppression has the value INCORRECT, and the velocity of the vehicle is above the first threshold value when the engine is running. In step 302 it is interrogated whether the driver issues the command "do not stop". If this is the case, the parameter stop_suppression is set to TRUE in step 303 and a transition to step 304 occurs. Otherwise (if the driver does not issue the command "do not stop") a transition from step 302 to step 304 occurs directly.

In step 304 it is interrogated whether the velocity of the vehicle is below the first threshold value. If this is the case, in step 305 the value of the parameter stop_suppression is interrogated. If this parameter has the value TRUE the engine is kept in the running state and a transition to step 306 occurs. In step 306 it is interrogated whether the velocity of the vehicle is above a second threshold value. If this is the case, the parameter stop_suppression is set to INCORRECT (step 307). Otherwise, the step 306 is carried out repeatedly. The suppression of switching off is therefore reset if a specific threshold velocity has been exceeded for the first time, which can indicate, for example, that a parking maneuver is finished. Alternatively or additionally it is possible, in an embodiment which is not illustrated in a flowchart, for a timer to be additionally provided, which timer is reset, after a predefined time of, for example, one minute stop_suppression has expired, with the result that the suppression of switching off is activated automatically again after relatively long intervals.

If the parameter stop_suppression has the value INCORRECT in step 305, the engine is stopped in step 308. It is then interrogated in step 309 whether the driver activates the accelerator pedal. If this is the case, the engine is started in step 310. Otherwise, step 309 is carried out repeatedly.

Figure 4:
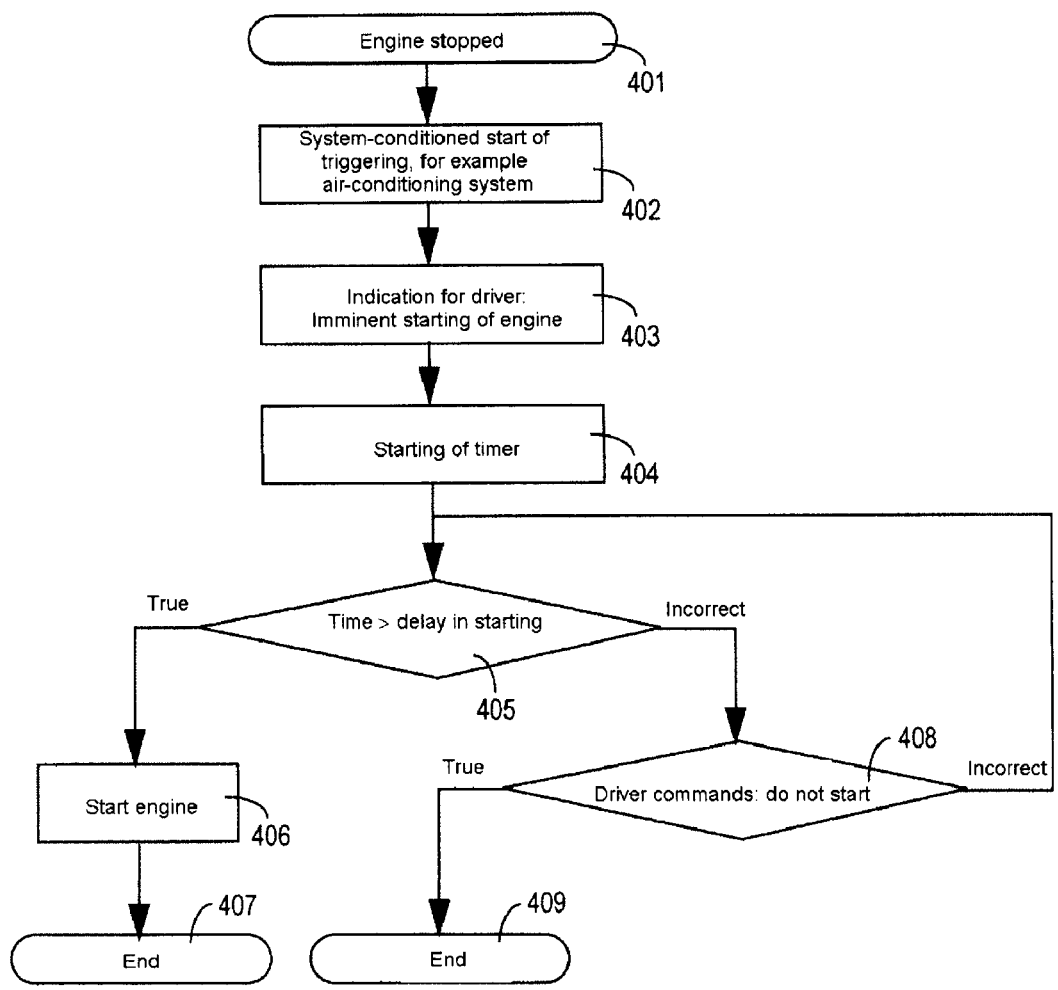

FIG. 4 shows a flowchart illustrating the effect of the command "do not start". This command permits the driver to carry out selective suppression, in a specific situation, for example in order to operate an air conditioning system, of starting of the internal combustion engine which is imminent owing to a triggering event which is basically occurring.

In the initial state 401, the engine is switched off. In step 402, a system-induced triggering event for triggering restarting, for example for operating an air-conditioning system, occurs. In step 403, the message "imminent starting of engine" is indicated to the driver, after which a timer is activated in step 404. In step 405 it is interrogated whether the time period measured by the timer is above a delay in starting. If this is the case, in step 406 the engine is started and the procedure is ended in step 407. If the time period measured in step 405 is not above the delay in starting, in step 408 it is interrogated whether the driver issues the command "do not start". If this is the case, the procedure is ended in step 409. Otherwise, a return to step 405 occurs.

Figure 5:
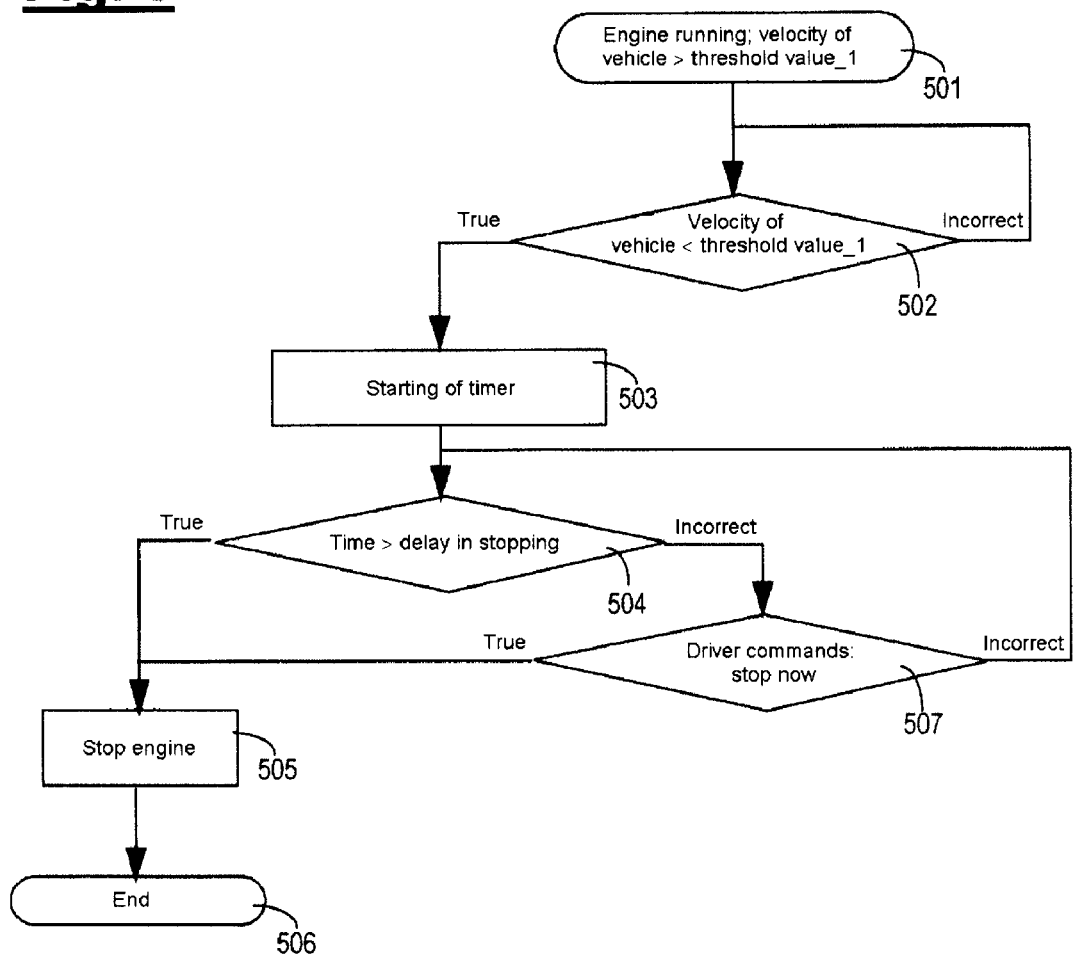

FIG. 5 shows a further flowchart explaining the effect of the command "stop now". This command also makes it possible that in a certain situation the driver can also switch off the internal combustion engine prematurely, i.e. before a time period or delay in stopping, which must basically be observed until stopping occurs after a certain velocity of the vehicle has been undershot, has expired.

In the initial state 501, when the engine is running the velocity of the vehicle is above a first threshold value. In the following step 502, it is interrogated whether the velocity of the vehicle has dropped below the first threshold value. As long as this is not the case, the step 502 is carried out repeatedly. As soon as the velocity of the vehicle has dropped below the first threshold value, a timer is actuated in step 503. In step 504 it is interrogated whether the time period which is measured by the timer is above the delay in stopping. If this is the case, in step 505 the engine is switched off and the procedure is ended in step 506. If the time period measured in step 504 is not above the delay in stopping, in step 507 it is interrogated whether the driver issues the command "stop now". If this is the case, a transition to step 505 occurs. If the driver does not issue the command "stop now" in step 507, a return to step 504 occurs.

Figure 6:
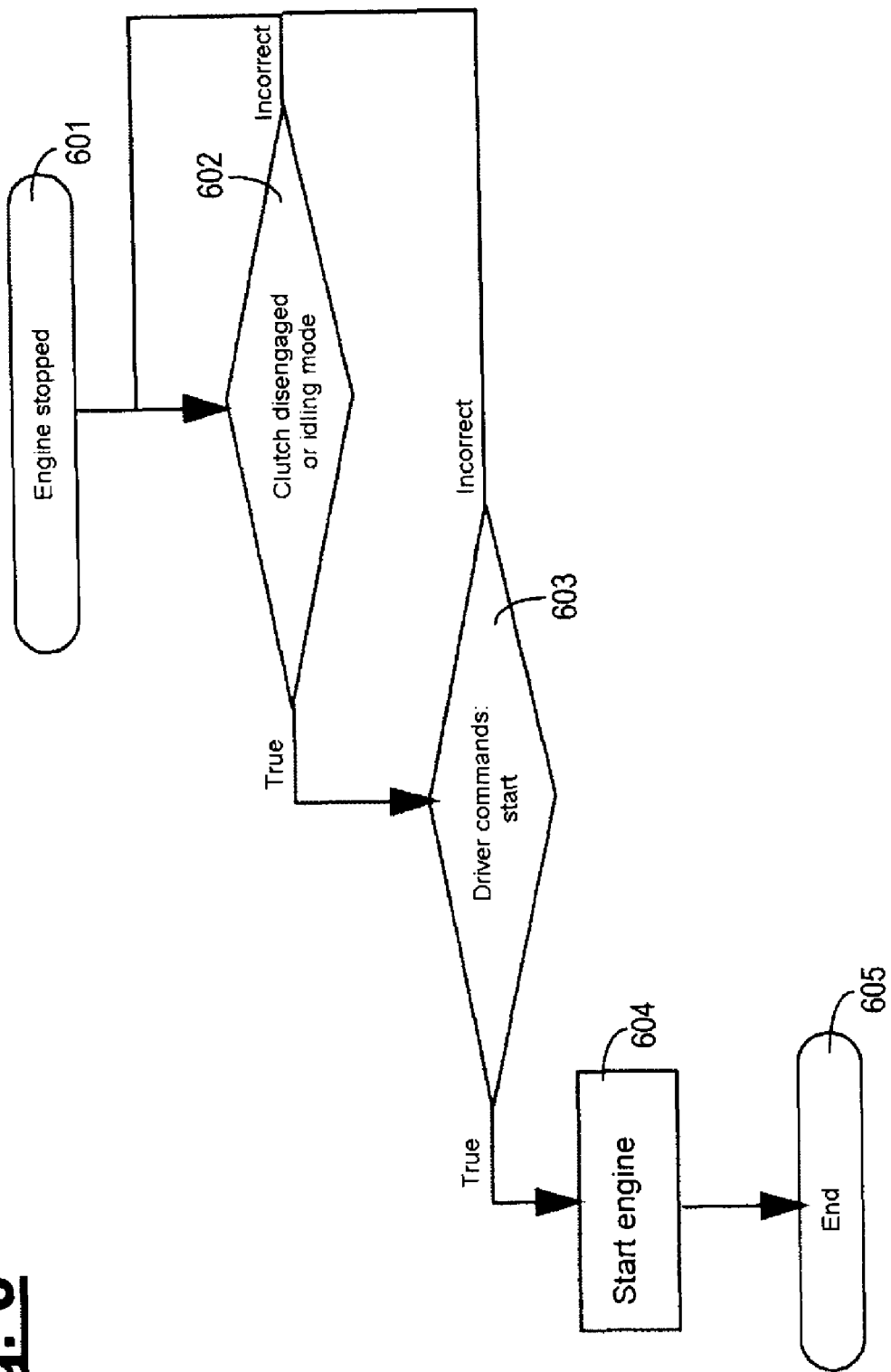

FIG. 6 shows a further flowchart explaining the effect of the command "start". This command permits the driver to start the internal combustion engine in a specific situation independently of the current operating conditions and the presence of any triggering events for starting of the engine, but in such a case it is ensured that this can take place only when the clutch is disengaged or in the idling mode.

In the initial state 601, the engine is switched off. In the following step 602 it is interrogated whether the clutch is disengaged or whether the transmission is in the idling mode. If one of these conditions is met, in step 603 it is interrogated whether the driver issues the command "start". If this is the case, in step 604 the engine is started and the procedure is ended in step 605. If the driver does not issue the command "start" according to step 603, a return to step 602 occurs.

Further refinements are considered in particular if the vehicle is a hybrid vehicle with a comparatively strong electric motor and which can be driven exclusively electrically. In this context, additional commands may be provided which bring about switching over to exclusively electric driving. A corresponding command, for example "electric drive" or "without engine" switches off the engine and brings about electric driving if the charge state of the battery permits.

The invention claimed is:

1. A control device for a motor vehicle having an internal combustion engine and a stop/start device,
   wherein the stop/start device switches off the internal combustion engine automatically when at least one stop condition is met,
   wherein the switching off of the internal combustion engine when the stop condition is present does not take place until after a switch off delay time has passed, and
   wherein the control device prevents, in reaction to a first voice command, the automatic switching off of the internal combustion engine for a predefined time period until a predefined vehicle operating state criterion has been fulfilled, irrespective of whether or not the stop condition was already met at the time when the voice command was issued.

2. The control device as in claim 1, wherein the predefined vehicle operating state criterion comprises the motor vehicle exceeding a velocity threshold value or the internal combustion engine exceeding a rotational speed threshold value.

3. The control device as in claim 1 wherein the control device is designed to trigger directly automatic switching off of the internal combustion engine in reaction to a second voice command when the stop condition is present, without waiting for the switch off delay to pass.

4. The control device as in claim 1 wherein the stop/start device automatically starts the internal combustion engine when at least one start condition is met, and wherein the control device triggers direct automatic starting of the internal combustion engine in reaction to a third voice command when the engine is switched off if a transmission which is assigned to the internal combustion engine is in the idling mode and/or the clutch of the internal combustion engine is disengaged.

5. The control device as in claim 1 wherein the stop/start device starts the internal combustion engine automatically when at least one start condition is met, and wherein the control device does not carry out automatic starting of the internal combustion engine which is indicated to the driver by at least one of a visual indication and a voice output, and is implemented with a predefined delay in reaction to a fourth voice command.

6. The control device in claim 1 wherein the control device continuously blocks the automatic switching off of the internal combustion engine in reaction to a fifth voice command issued at any desired time while the vehicle is operating, wherein the blocking is canceled again in reaction to a sixth voice command.

7. The control device as claim 1 wherein the control device locates the starting location of the voice commands and takes into account only the voice commands which are issued from the position of the driver of the motor vehicle.

8. The control device as in claim 1 wherein the motor vehicle is embodied as a hybrid vehicle, and wherein the control device switches over to exclusively electric driving in reaction to a seventh voice command.

9. A method for controlling the operation of an internal combustion engine in a motor vehicle having an internal combustion engine and a stop/start device, wherein the stop/start device switches off the internal combustion engine automatically when at least one stop condition is met, the method having the steps of:
   switching off of the internal combustion engine when the stop condition is present does not take place until after a switch off delay time has passed, preventing, in reaction to a first voice command, the automatic switching off of the internal combustion engine for a predefined time period or until a predefined vehicle operating state criterion has been fulfilled, irrespective of whether or not the stop condition was already met at the time when the voice command was issued.

* * * * *